April 16, 1935. L. A. SAFFORD 1,997,749
CLAMPING DEVICE FOR AIR BRAKE TEST RACKS
Filed June 5, 1933 2 Sheets-Sheet 2
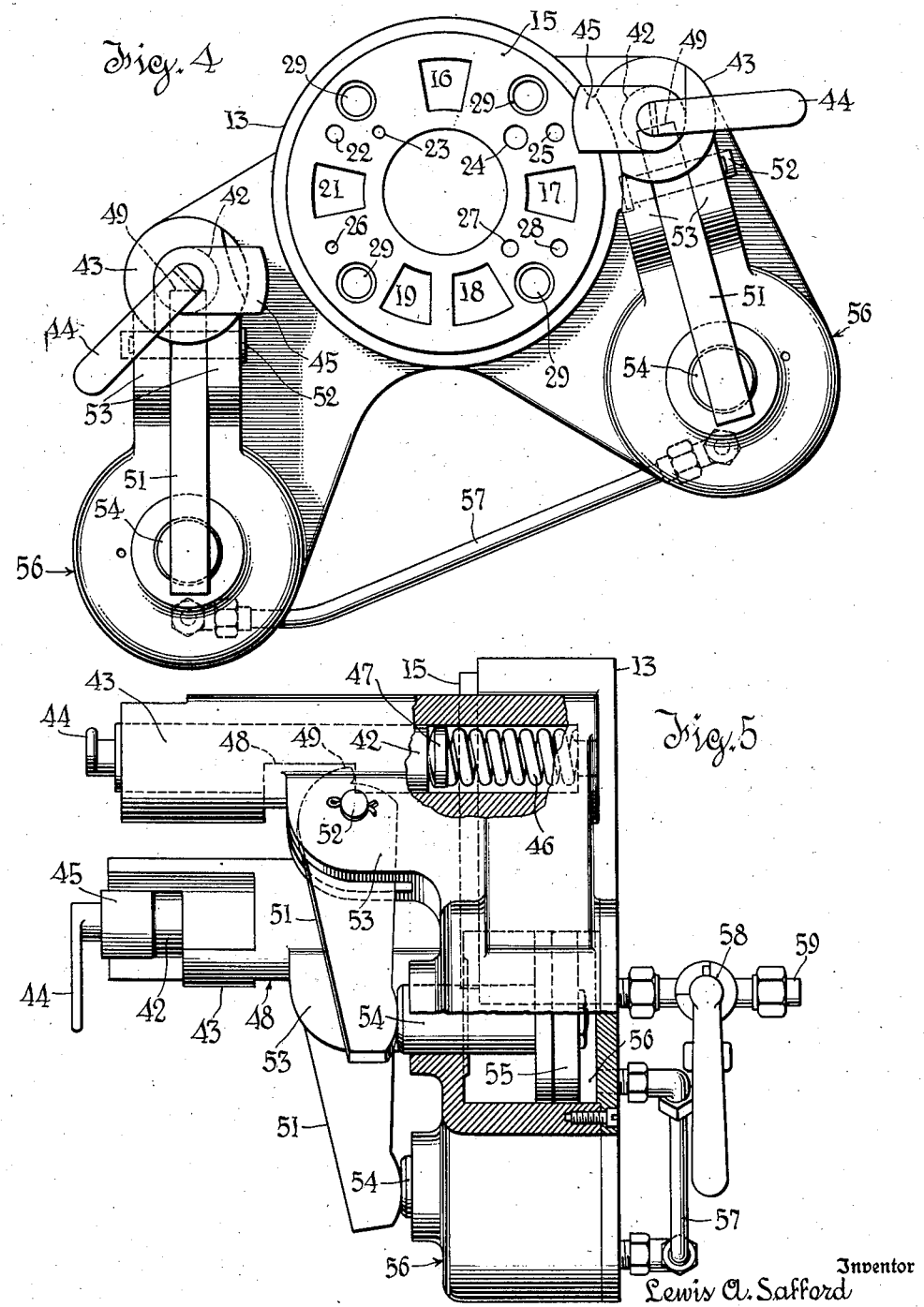
Inventor
Lewis A. Safford
By
Dodge and Ives
Attorneys Patented Apr. 16, 1935

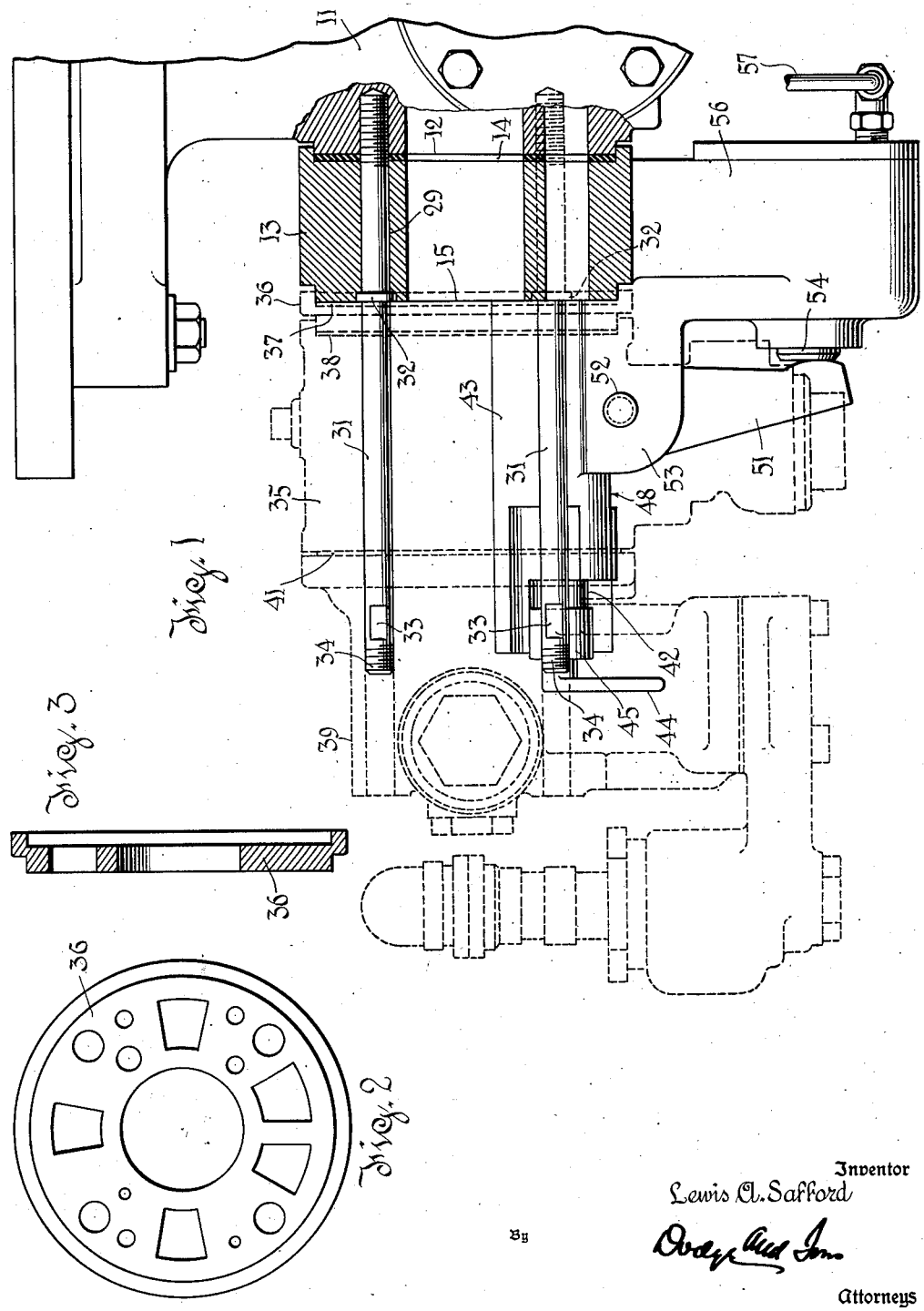

1,997,749

UNITED STATES PATENT OFFICE 1,997,749

CLAMPING DEVICE FOR AIR BRAKE TEST RACKS

Lewis A. Safford, Watertown, N. Y., assignor to The New York Air Brake Company, a corporation of New Jersey Application June 5, 1933, Serial No. 674,434

3 Claims. (Cl. 73—51)

This invention relates to clamping devices for use with test racks for air brake valves.

The invention was developed for use in facilitating the testing of quick action portions of what are known in the air brake industry as U12 and U12B valves on the 3USB test rack, and will be described as so applied, but without implying limitation to such use.

Features of the invention are the construction of the device for interposition as a filler piece between the rack and the parts to be tested; the use of small diameter, long stroke pistons with force multiplying levers, to save space and keep within clearances imposed by existing apparatus; and also various mechanical features which will be recognized as novel and useful as the description proceeds.

The preferred embodiment of the invention will now be described with reference to the accompanying drawings, in which:—

Fig. 1 is an elevation showing a portion of the pipe bracket of a 3USB test rack with the invention applied. The quick action portion, the high pressure cap, and a removable auxiliary filler piece are indicated in dotted lines in position to be clamped.

Fig. 2 is a face view of the removable auxiliary filler piece.

Fig. 3 is a view thereof in axial section.

Fig. 4 is a face view of the clamping device.

Fig. 5 is a side elevation of the clamping device with portions broken away to show one cylinder and its piston, and portions of one plunger and its return spring.

Referring first to Fig. 1 a portion of the pipe bracket of the test rack is indicated at 11. This has a ported mounting face 12, of known form, against which, in the ordinary use of the 3USB rack the quick action portion to be tested would be mounted. Instead of so mounting such portion a member 13, which not only serves as a filler piece but also forms the base of the clamping device, is mounted on face 12 with an intervening ported gasket 14.

The filler piece 13 has a mounting face 15 on its outer side, and is formed with through ports 16, 17, 18, 19, 21, 22, 23, 24, 25, 26, 27 and 28, so arranged that the mounting face is a duplicate of the mounting face 12 (see Fig. 4).

The filler piece 13 has four bolt holes 29 with shouldered counterbores at the face 15. The bolt holes 29 aline with the usual tapped holes in the bracket 11 and receive four long bolts 31 which pass through the filler piece 13 and screw into the body 11. Collars 32 on bolts 31 seat in the counterbores above mentioned and serve to clamp the filler piece in place. Flats 33 offer a wrench grip to screw the bolts home.

Threads 34 are provided at the outer ends of bolts 31 and are used in conjunction with pipe filler pieces to lock a blanking plate against seat 15 and seal the latter if the rack itself is to be tested. The blanking disk, pipe filler pieces, and nuts are not directly concerned with the present invention, and hence are not illustrated.

In Fig. 1 there is illustrated at 35 an old style (U12) quick action portion, and a removable auxiliary filler piece 36 ported to correspond to seat 15. Ported gaskets are interposed at 37 and 38. When a new style (U12B) quick action portion is to be tested, the filler piece 36 and one gasket (say 38) are omitted, since the length of the U12B portion equals the length of the U12 portion plus the filler piece. The high pressure cap is shown at 39 with gasket 41. The projecting outer ends of bolts 31 pass through the parts 35 to 41 and hold them in position to be clamped.

The clamps comprise two cylindrical plungers 42, guided in paths parallel with bolts 31, by means of ways formed in extensions 43 which project from the filler piece 13. Each plunger may be swiveled about its longitudinal axis by means of a corresponding handle 44 and carries a clamp lug 45 which is brought by such swiveling motion either into or out of position to engage the flange of high pressure cap 39 as the plungers are drawn in.

The lugs 45 coact with portions of extensions 43 to limit the swiveling motion of the plungers, particularly to define the engaging position of each plunger. Each plunger is urged outward by a coil compression spring 46 reacting through a thrust disk 47 which presents a convex face to the end of the plunger and thus minimizes friction.

The plungers 42 are notched at 48 to receive the noses 49 of force multiplying levers 51, which are rocked to draw the plungers inward and which also serve to limit the outward motion of the plungers. The levers are pivoted on pins 52 which pass through the levers and the ears 53. The arm of each lever remote from nose 49 is of substantial length and is in thrust engagement with plunger 54 of a corresponding single-acting piston 55. The pistons 55 work in cylinders 56 and the two cylinders are connected by a pressure-equalizing passage, here shown as a pipe 57 external to member 13. Any other pressure equalizing connection might be substituted.

A combined admission and exhaust cock 58 has two positions in which respectively it connects one cylinder 56 (and hence both cylinders) with atmosphere (see Fig. 5), or with the pressure fluid (compressed air) line 59.

After the quick action portion and high pressure cap, with suitable gaskets and with the auxiliary filler piece (if needed) have been positioned on the bolts 31 as shown, the handles 44 are swung to set the lugs 45 in engaging position, valve 58 is shifted to admit pressure fluid so that plungers 54 are forced outward, and plungers 42 are drawn inward, at a force multiplying ratio.

The parts are then tested. Upon completion of the tests, valve 58 is shifted to vent the pressure fluid so that plungers 42 are forced out by springs 46. Handles 44 are then turned to retract lugs 45 and the tested parts are removed.

What is claimed is,—

1. The combination of a test device having a ported face; a member adapted to be mounted on said face, and affording a second mounting face having ports located similarly to and in communication with corresponding ports of the first; threaded connectors passing through said member and engaging the test device, said connectors having extensions projecting from the second mounting face to position the device to be tested; and fluid pressure actuated clamping means carried by said member and adapted to hold a device to be tested against said second face.

2. The combination of a test device having a ported face; a member adapted to be mounted on said face, and affording a second mounting face having ports located similarly to and in communication with corresponding ports of the first; threaded connectors passing through said member and engaging the test device, said connectors having extensions projecting from the second mounting face to position the device to be tested; and fluid pressure actuated clamping means carried by said member and comprising a plurality of pressure motors, and plungers shiftable longitudinally by said motors, the plungers having work engaging means shiftable into and out of engaging positions by rotation about axes parallel with the line of longitudinal shift of the plungers.

3. A work clamping device for use with a test device having a ported face, comprising in combination, a member adapted to be mounted on said face, and affording a second mounting face having ports located similarly to and in communication with corresponding ports of the first face; attaching means passing through said member and engaging said test device, said attaching means being provided with means to position the device to be tested on said member; and fluid pressure actuated clamping means, carried by said member and comprising a plurality of pressure motors, longitudinally shiftable plungers, and force multiplying levers interposed between said motors and corresponding plungers.

LEWIS A. SAFFORD.